April 8, 1924.

E. WAHL

LAWN TRIMMER

Filed Dec. 29, 1922

Witness:
C. J. Sauser

Inventor:
Egidius Wahl
By Walter M. Fuller
Atty.

April 8, 1924.  
E. WAHL  
1,489,868
LAWN TRIMMER
Filed Dec. 29, 1922    2 Sheets-Sheet 2
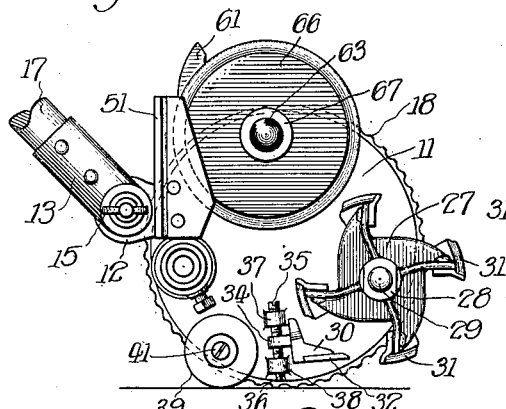
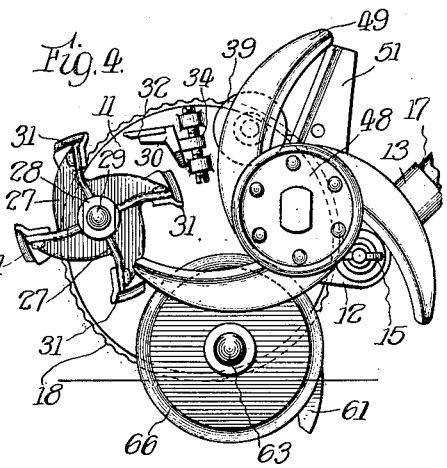
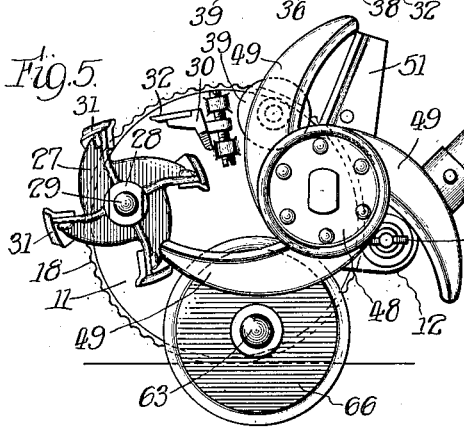
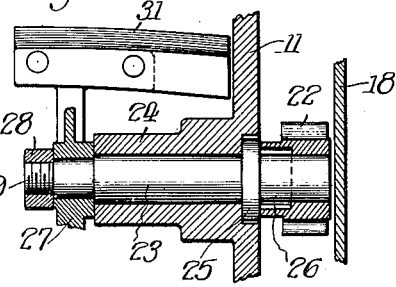
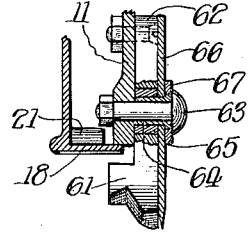
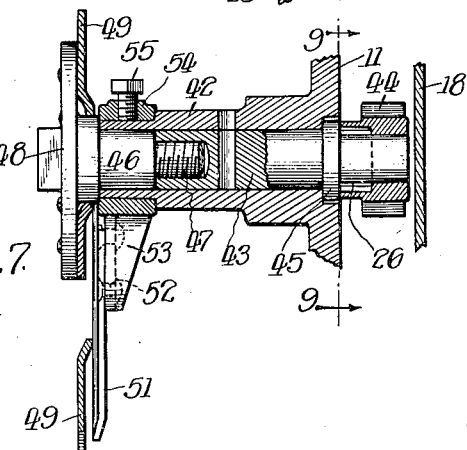
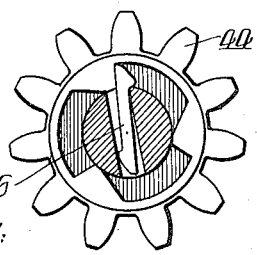

Patented Apr. 8, 1924.

1,489,868

UNITED STATES PATENT OFFICE.

EGIDIUS WAHL, OF CHICAGO, ILLINOIS.

LAWN TRIMMER.

Application filed December 29, 1922. Serial No. 609,594.

*To all whom it may concern:*

Be it known that I, EGIDIUS WAHL, a citizen of the United States, residing at Chicago, in the county of Cook and State of Illinois, have invented certain new and useful Improvements in Lawn Trimmers, of which the following is a specification.

My invention relates to novel and advantageous improvements in lawn-mowers, lawn-trimmers and associated or complementary mechanisms designed to afford distinct benefits in performing the lawn cutting and trimming operations, as well as to supply efficient means for providing a small trench or furrow at the edge or border of the lawn.

One aim of the invention is the provision of a new style of lawn-dressing appliance which will trim the edge of the lawn alone or simultaneously with the cutting of the grass adjacent to such edge or border.

A further purpose of the invention is the production of a lawn-mower so designed and constructed that it will cut the grass close up to various objects, such for example as tombstones in cemeteries.

Another prime design of the invention is to supply a simple and effective means for plowing a ditch or furrow at the edge of the lawn or along the sidewalk by a mere reversal of the appliance, under which circumstances the lawn cutting and trimming mechanisms are inoperative.

To the accomplishment of these and other desirable ends I have devised the preferred embodiment of the invention illustrated in the accompanying drawings, throughout the several views of which like reference characters refer to the same parts, and a consideration of these drawings in connection with the following detailed description of the construction and mode of operation will render clear to all those skilled in this art the various structural and functional advantages accruing from the employment of the new structure. In these drawings,—

Fig. 3, on the reduced scale, shows the appliance used solely as a lawn-mower, a portion of the trimming-mechanism having been removed;

Fig. 4 shows the appliance employed for plowing out the trench or furrow and at the same time cutting or pressing down into the earth the overhanging blades of grass;

Fig. 5 illustrates the use of the structure for cutting the edge of the lawn, the plow having been removed so that no furrow is made;

Fig. 6 is a fragmentary vertical cross-section through the lawn-mower part of the device;

Fig. 7 is a similar section through the lawn-trimming portion of the appliance.

Fig. 8 is a fragmentary detail section through the furrow-forming section of the machine; and Fig. 9 is an enlarged section on line 9—9 of Fig. 7, showing one of the one-way clutches.

Figure 2:
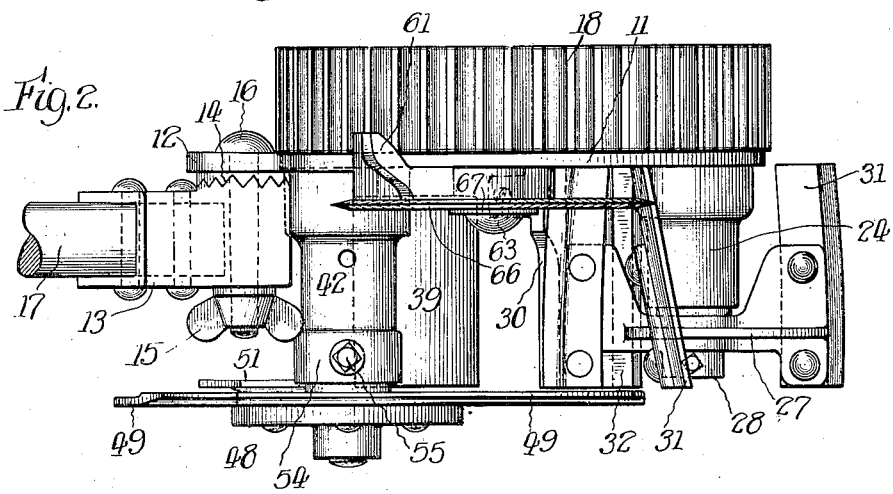
Fig. 2 is a plan view of the structure depicted in Fig. 1.

Referring to these drawings, it will be perceived that the new lawn mowing and trimming device includes a main, generally-circular, disc support or plate 11 supplied, as is indicated in Fig. 2, with a serrated boss 12 with which co-operates a handle-socket 13 having radial ribs or serrations 14 co-acting with those of such main support, the construction permitting the socket to assume any desired angular adjustment, as will be readily understood, the socket being held or fixed in the required position by the interfitting serrated parts held together by a wing-nut 15 associated with a bolt or screw 16 extended through the aligned holes of the support and socket, the latter having an operating handle 17 of any usual or convenient construction and by means of which the lawn mowing and trimming appliance is pushed along.

An externally, transversely, grooved or ribbed ground or carrying wheel 18 is mounted in any approved manner to revolve on a shaft or stud 19 carried substantially centrally by the support and outstanding therefrom, and such wheel has on the inner face of its flange an internal gear 21 the teeth of which are in mesh with a pinion 22 (Figs. 1 and 6) on a shaft 23 revoluble in a bearing or hub 24 integral with and extended outwardly from the other face of the support, such shaft having an enlargement or collar 25 bearing against one face of the support, a one-way clutch 26 of any suitable form, such as that shown in Fig. 9, being interposed between the pinion and the shaft so that the latter can be rotated in one direction only, as is customary in lawn-mowers.

Just beyond the end of the hub or bearing 24, the shaft has a spider 27 fixed thereto, being held on the shaft by a nut 28 engaging a reduced-diameter, threaded part 29 of the shaft.

Such spider 27 at the ends of its arms carries a plurality of obliquely-disposed cutter knives or blades 31 reaching practically from the support 11 to a position slightly beyond the end part 29 of the shaft.

A co-operating, relatively-stationary cutter-blade 32 (Fig. 1) is mounted on a block 30 fulcrumed on the support at 33 and having a lug or extension 34 disposed between two, oppositely - arranged, adjustment-screws 35 and 36 accommodated in threaded holes through a pair of spaced bosses 37 and 38 forming a part of and outstanding from the main body of the support on that side carrying the blade 32 and the coacting, rotary blades 31.

By this simple means the position of the stationary cutter 32 may be easily regulated with respect to the revolving blades 31 to assure efficient shearing action during the lawn-mowing operation.

On an outstanding stud or stationary shaft 41 carried by the support, a suitable roller 40 is revolubly mounted, such element assisting in supporting the appliance and also performing to some extent a lawn-rolling function.

The main support 11 also has a hollow hub 42 parallel to the hub 24, projecting from the same side of the support as such other hub, and internally affording a bearing for a shaft 43 equipped at one end with a pinion 44, the teeth of which are also in mesh with those of the internal gear 21, a like one-way clutch 26 being interposed between the pinion and shaft so that the latter will be revolved in a single direction only.

To assist in maintaining the shaft 43 in its bearing, it has an enlargement or collar 45 bearing against one face of the support 11, and a short auxiliary or supplemental shaft 46 has a threaded portion 47 of reduced diameter screwed into a threaded cavity in the other end of shaft 43, this connection being of a left-hand thread construction so that in normal operation the two shafts will be effectively united and operate as a single shaft.

Shaft 46 has a disc 48 to which are riveted a plurality, in the present instance three, of curved, sharp-edged blades 49, 49, 49, in a plane substantially coincident with that of the outer ends of the knives 31 of the lawn-mower, so that these blades during their revolution may trim or cut off those blades of grass which overhang the edge of the lawn, the marginal portion of which is at the same time being mowed by the blades 31.

It is necessary, however, that these revoluble blades 49 should have a stationary blade with which to coact to perform their shearing functions, and accordingly such a blade 51 is riveted at 52 to a downward extension 53 on a collar 54 on a reduced part of the hub 42 on which it may be rocked to different positions of adjustment, being held in the required position by a set-screw 55.

This blade 51 extends down into the furrow or trench at the edge of the lawn, and the revolving blades 49 in their co-operation therewith trim the edge of the lawn in a manner which will be readily understood.

A plow or trench-digger 61 of suitable shape and form, as illustrated in the drawings, is demountably carried on the support 11 by two bolts 62 and 63 extended through registering holes in the shank of the plow and in the support.

An inner collar or sleeve 64 surrounds bolt 63, and between this and the opening in the plow there is another sleeve or collar 65 of slightly less length.

A circular, sharp-edged disc or cutter 66 is mounted to revolve freely on sleeve 64 between the end of the other sleeve 65 and a washer 67 under the head of the retaining bolt 63, the details of this construction being illustrated most clearly in Fig. 8.

Figure 1:
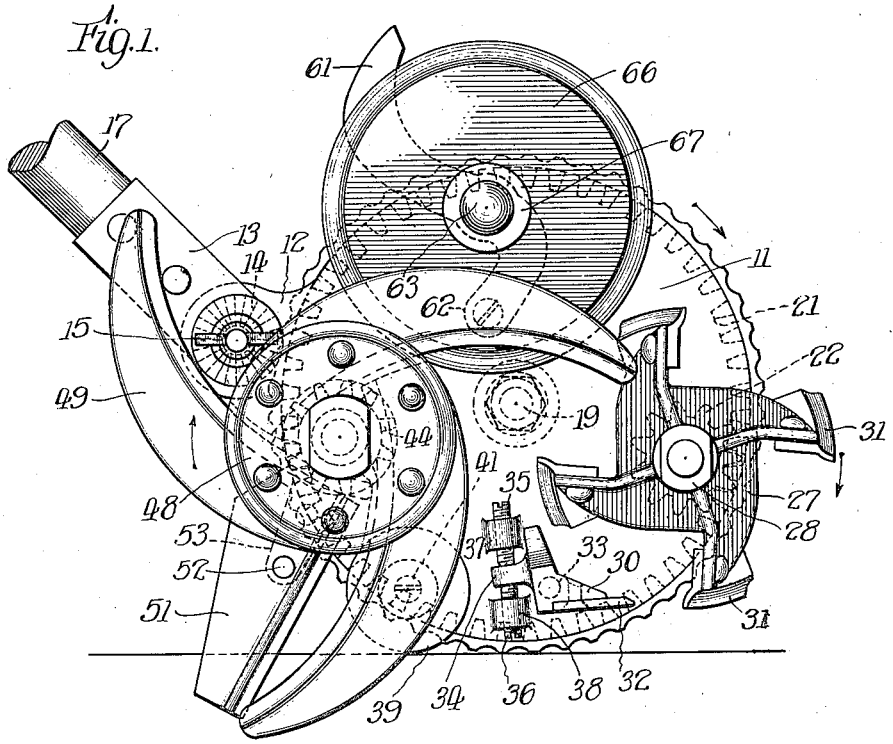
Fig. 1 is an elevation of the improved mechanism, the operating handle by which it is pushed along over the lawn being broken off.

The operation of the improved appliance occurs practically as follows while it is being pushed forwardly by the operator by means of the handle 17:

Assuming that the parts are in the positions shown in Fig. 1, then, during such travel of the machine while it is supported by the wheel 18 and the roller 40, the blades 31 and 49 will be revolved in a clockwise direction as the parts are viewed in Fig. 1, the lawn-mower 31, 32 cutting the grass in the usual manner along the border or margin of the lawn, while the rotating blades 49 in coaction with the stationary blade 51 cut off those blades of grass projecting beyond the edge of the lawn and which are not severed by the lawn-mower proper 31, 32, whereby a neat trimming of the edge of the lawn is easily secured.

In some cases it is desirable to cut the grass close to immovable objects such as monuments, tombstones, steps, buildings and the like, and around which there are no trenches for the accommodation of the blades 49 and 51.

Under these conditions, the shaft 46 and its blades 49 are removed from the appliance by merely unscrewing the stem 47 from the threaded socket in shaft 43, and the stationary blade 51 and its mounting may be also removed, or such blade may be swung up into inoperative position, as indicated in Fig. 3.

Inasmuch as there is nothing on the appliance as thus adjusted extending beyond the ends of blades 31, their cutting action may be brought very close to the objects in question, thus doing away with the necessity of hand-trimming with shears around such bodies.

During both of these operations the plow and its disc are inoperative, being located at the upper portion of the support, as is clearly depicted in Fig. 1.

When it is desired to provide a furrow along a side-walk or around the margin of the lawn, the appliance is reversed to the position shown in Fig. 4, with a proper angular adjustment of the operating handle 17, and while the wheel 18 rolls along the sidewalk, for example, the plow 61 forms the furrow or trench and delivers the dirt sidewise onto the sidewalk, from which it can be easily removed.

At the same time, the rotary disc 66, which is not power-driven, either cuts off the blades of grass at the edge of the trench which come in contact with it, or else such disc forces the blades down into the earth, so that a neat appearance of the lawn is formed in both cases.

If it should be desired to merely cut the blades of grass or press them down into the earth to provide an attractive appearance for the lawn at the edge of the sidewalk, the plow can be readily removed and the disc 66 used alone, all as will be obvious and readily understood.

It is to be noted that when the appliance is in the position shown in Fig. 4, for the use of the plow or cutter, or both together, the blades of the lawn-mower and the cutters of the trimmer do not revolve because of the one-way drive connection between the wheel 18 and their shafts.

Therefore we have a direct co-operative relation between the support, the various mechanisms described, and their driving means, so that they can be brought into position and operated, or shifted into inoperative position and rendered inoperative so far as the driving means is at that time concerned, although such driving means does at the same moment perform important functions with respect to other portions of the mechanism then in use.

It is to be understood that this invention is not limited or restricted to the precise and exact details of construction because these may be modified within comparatively wide limits without departure from the heart and essence of the invention and without the sacrifice of any of its substantial benefits and advantages.

I claim:

In a lawn-mower, the combination of a support, a handle therefor, a ground-wheel revolubly mounted on one side of said support, a lawn-mowing means supported from its inner end only on the opposite side of said support, means operated by the rotation of said ground-wheel to actuate said mowing means, and cutting means supported from its inner side only on the same side of said support as the lawn-mowing means and operative near the unsupported end of said mowing means to trim the edge of the lawn immediately after that part of the lawn adjacent to such edge is cut by said mowing means and before the grass has an opportunity to spring up, said cutting means comprising a series of rotary blades revolved by said ground-wheel and a stationary blade mounted on said support and of a length to project below the level of the bottom of said ground-wheel.

In witness whereof I have hereunto set my hand and seal.

EGIDIUS WAHL. [L. S.]